Jan. 10, 1950 F. T. SMITH Re. 23,190

LAND LEVELER

Original Filed April 12, 1946 3 Sheets-Sheet 1

INVENTOR.
Fred T. Smith

BY

M. A. McGreen

ATTORNEY

Jan. 10, 1950 F. T. SMITH Re. 23,190

LAND LEVELER

Original Filed April 12, 1946 3 Sheets-Sheet 2

INVENTOR.
Fred T. Smith

BY
M. A. McGrew

ATTORNEY

INVENTOR.
Fred T. Smith

BY
A. A. McGrew
ATTORNEY

Reissued Jan. 10, 1950

Re. 23,190

UNITED STATES PATENT OFFICE 23,190

LAND LEVELER

Fred T. Smith, Golden, Colo.

Original No. 2,428,857, dated October 14, 1947, Serial No. 661,660, April 12, 1946. Application for reissue April 2, 1948, Serial No. 21,735

6 Claims. (Cl. 37—153)

Matter enclosed in heavy brackets [ ] appears in the original patent but forms no part of this reissue specification; matter printed in italics indicates the additions made by reissue

1

The present invention relates to new and useful improvements in land levelers designed primarily for use on irrigated farms to level the surface of the soil so that the water may be evenly distributed without causing water to be collected in low areas.

An important object of the present invention is to provide a tractor drawn device of this character by means of which the same may be operatively connected to the hydraulic lift of the tractor to raise the leveler out of contact with the ground while transporting the leveler from place to place.

A further object of the invention is to provide a land leveler of this character including a scraper blade drawn behind the tractor together with a gauge blade drawn behind the scraper blade and adjustable vertically to regulate the depth of the scraper blade.

*Another important object of my invention is to provide a tractor-drawn leveler having a scraper blade and a trailing gauge blade linked to the tractor by a quadrangular linkage in such manner that a plane extending, for example, through the gauge blade and the scraper blade is moved by the said linkage proportionately to and in the same direction as a plane including, for example, the front and rear tractor axles.*

A still further object of the invention is to provide a device of this character of simple and practical construction, which is efficient and reliable in use, relatively inexpensive to manufacture, which may be easily and quickly attached in operative position to a tractor without necessitating any material changes or alterations therein and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
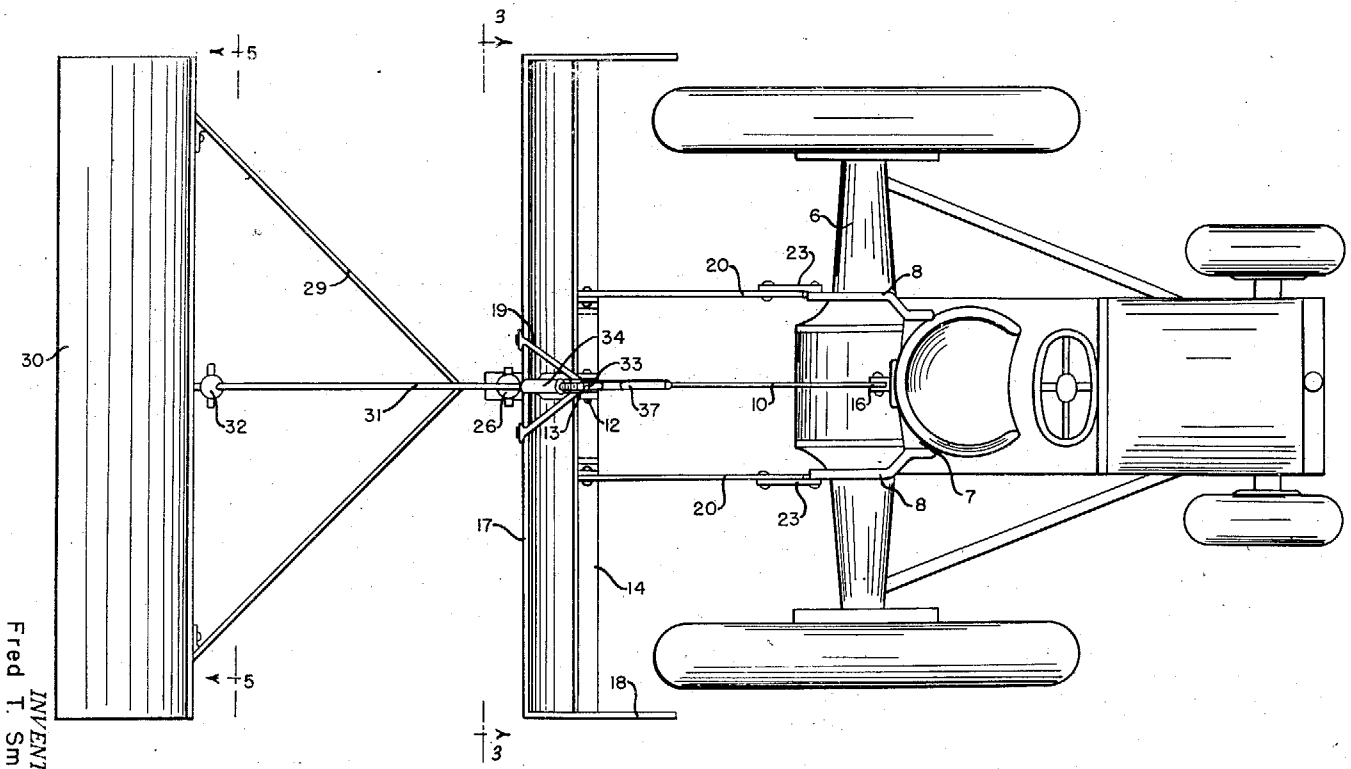
Fig. 1 is a top plan view.

Referring now to the drawings in detail, wherein for the purpose of illustration I have disclosed

2 a preferred embodiment of invention, the numeral 5 designates a tractor of conventional construction and which includes the rear axle housing 6 and hydraulic lift mechanism 7 from which a pair of lift arms 8 project rearwardly in spaced parallel relation at opposite sides of the mechanism.

Secured to the rear edge of the housing of the lift mechanism 7 between the lift arms 8 is a pair of spaced apart apertured ears 9 to which the front end of a rearwardly extending arm 10 is pivotally connected, the rear end of the arm 10 being pivoted on a pin 12 connecting the upper ends of a pair of bars 13.

The lower ends of the bars 13 extend downwardly in diverging relation and are welded or otherwise fixedly secured to a transversely extending angle iron 14. The angle iron 14 is welded or otherwise suitably secured at the uper edge of a forwardly projecting wing 18 formed at each end of a scraper blade 17. A pair of rearwardly inclined braces 19 extend from the upper connected portion of the bars 13 to the upper edge of the scraper blade 17.

A pair of lower arms 20 have their front ends pivoted to the underside of the axle housing 6 by means of brackets 21 and the rear ends of the arms 20 are pivoted to the angle iron 14 by means of lugs 22.

The rear ends of the lifting arms 8 are connected to the lower arms 20 by pivoted links 23.

A bracket or lug 24 is welded or otherwise suitably secured to the rear of the scraper blade 17 at the center thereof and on which is welded a ball 25 having a split socket 26 swivelly mounted thereon. The edges of the socket 26 are provided with apertured ears 27 connected to each other by bolts 28 for securing the split edges of the socket in position on the ball.

A pair of rearwardly diverging braces 29 have their front ends welded or otherwise suitably secured to the socket 26 and their rear ends similarly secured adjacent the outer ends of the rearwardly curving gauge or drag blade 30 for dragging behind the scraper blade 17.

The gauge blade 30 is vertically adjusted by means of a *member* [rod] 31 swivelly connected at its rear end to the central portion of the gauge blade 30 by means of a ball and socket joint 32, the *member* [rod] 31 being inclined upwardly at its front end and formed adjacent its front portion with screw threads 33, threadedly engaged with an internally threaded sleeve 34 swivelly connected to a plate 35 by means of a ball and socket joint 36. The plate 35 is secured to the upper ends of the bars 13. The front end of the *member* [rod] 31 is formed with a crank handle 37.

*The operation of my device is best understood by comparing the movements of two imaginary planes, the first plane being herein referred to as the tractor plane and includes, for example, the ground contacting surfaces of the front and rear tractor wheels, or the tractor axles. The second plane, herein referred to as the leveler plane, may, for example, include the ground contacting edges of the gauge and scraper blades. For ease of description it may be assumed that the frame of the tractor or other prime mover is generally straight and approximately horizontal, and that the leveler is in effect a triangle including a horizontal leg 29 a vertical leg 13, and a hypotenuse member 31.*

Figure 2:
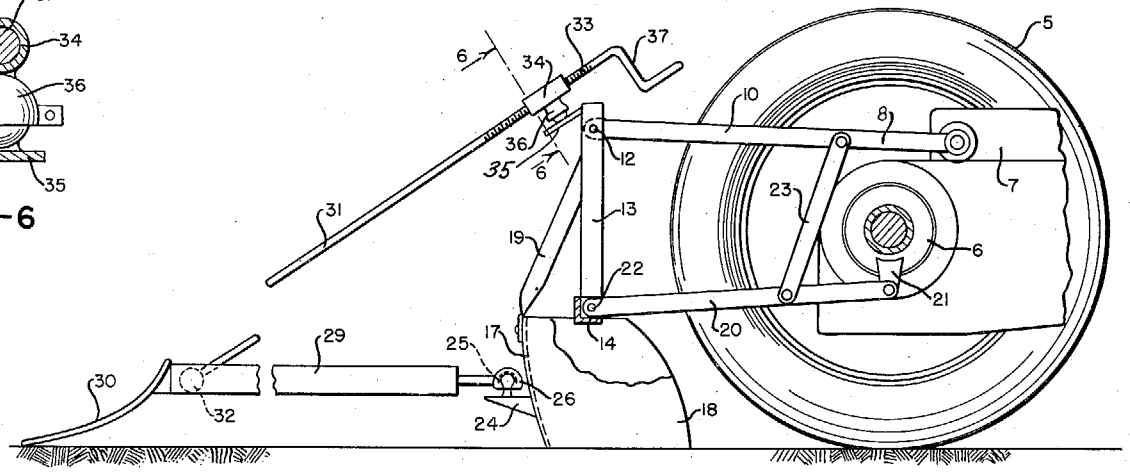
Fig. 2 is a longitudinal vertical view.
Figure 5:
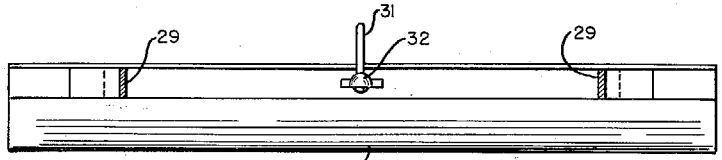
Fig. 5 is a transverse sectional view taken on a line 5—5 of Fig. 1.
Figure 6:
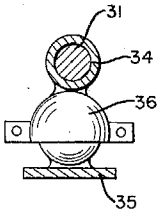
Fig. 6 is a fragmentary sectional view taken on a line 6—6 of Fig. [1]2.
Figure 3:
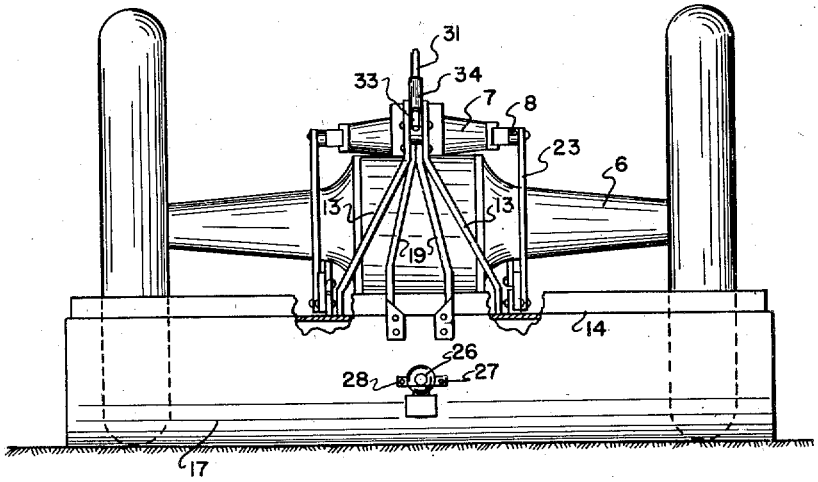
Fig. 3 is a transverse sectional view, taken on a line 3—3 of Fig. 1.
Figure 4:
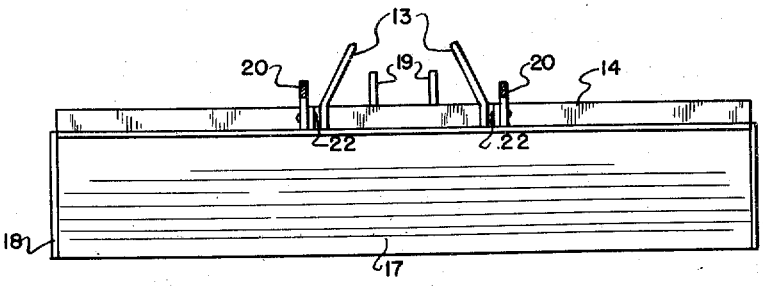
Fig. 4 is a front elevational view of the scraper blade.

*As will be apparent from the drawings, particularly Fig. 2, the tractor plane is connected to the leveler plane by a quadrangular linkage defined by the members 10, 13, 20, and the tractor. Since the arms 10 and 20 are all pivotally secured at their leading ends to the vertically spaced points fixed with respect to the tractor frame and also pivotally secured at their trailing ends to the member 13 at vertically spaced points, it may be seen that the leveler plane and in fact the entire triangular frame of the leveler will necessarily be tilted upwardly or downwardly as the tractor plane tilts upwardly or downwardly, and will move proportionately thereto in the same direction or sense.*

*Upward tilting of the tractor plane is produced either by raising the front wheels of the tractor or by lowering the rear wheels, it being immaterial which occurs, since in either event the tractor will have defined a change of ground level which requires the deposition of earth by the scraper blade. Upward tilting, i. e., elevation of the front wheels of the tractor plane, is communicated to the leveler plane through the quadrangular linkage, forcing the leveler plane to move in the same direction. This raises the scraper blade 17, thus allowing the deposition of earth carried by the blade. The reverse action of course occurs as the tractor plane tilts downwardly, since such action transmitted through the quadrangular linkage, tilts the leveler plane downwardly and thus forces the scraper blade more deeply into the soil.*

*The movement between the tractor and leveler planes is obviously proportionate and is fixed by the dimensions of the quadrangular linkage. If, for example, the arms 10 and 20 are parallel and of equal length, the movement of the two planes will be equal, and the quadrangular linkage will be in effect a parallelogram. I have illustrated a linkage in which the upper arm 10 is somewhat longer than the lower arms 20. Therefore, for a given vertical angular displacement of the tractor plane downwardly from the horizontal, the downward tilting movement of the leveler plane will be less than the upward tilting of the leveler plane when the tractor plane is tilted upwardly an equal degree from the horizontal. Stated in other words, by using the type of linkage herein illustrated the leveler plane is undercontrolled in a downward direction and overcontrolled when moving in an upward or earth-discharging direction. Undercontrol in an upward direction and overcontrol in a downward direction may be obtained by reversing the relationship between the arms 10 and 20, i. e., by making the arm 10 shorter than the arms 20.* [In the operation of the device, the scraper blade 17 is drawn behind a tractor 5 whereby high spots in the surface of the soil may be leveled and low spots filled by dumping the soil from the scraper blade 17 therein as the tractor moves over such low spots.

The scraper blade 17, gauge blade 30 and front wheels of the tractor are maintained on a horizontal plane so that as the scraper blade 17 passes over a low spot the dirt will be deposited therein.]

When the device is being moved to and from the field, the hydraulic lift arms 8 are raised whereby the lever arms 20 will be swung upwardly to raise the scraper blade 17 and gauge blade 30.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended *claims* [claim].

What is claimed is:

[In combination with a soil leveler having a transverse scraper blade, a transverse gage blade of substantially the same width as the scraper blade and positioned in rear of the scraper blade, universal means for connecting the gage blade to substantially the center of the scraper blade, whereby the gage blade may pivot in all directions with respect to the scraper blade, and means on the soil leveler for raising and lowering the gage blade with respect to the scraper blade.]

*2. Apparatus for leveling land of the type adapted to be drawn by a tractor and the like comprising a scraper blade, a first member extending upwardly from the scraper blade and fixed thereto, a gauge blade, a rigid, generally horizontal elongated second member connecting the gauge blade and the scraper blade, a third rigid member extending upwardly and forwardly from the gauge blade to the first member, defining thereby a triangular frame rigid in a vertical plane, and a freely floating quadrilateral linkage for floatingly connecting the scraper blade and the first member to the tractor so as to allow the scraper blade and the first member to be freely movable in a vertical direction with respect to the tractor, said quadrilateral linkage including a plurality of vertically spaced rigid arms each pivotally secured at one end to the said first member at vertically spaced points and adapted for pivotal attachment at their opposite ends to the tractor at vertically spaced intervals for movement in a generally vertical plane, whereby tilting movement of the tractor in a generally vertical plane is transmitted through the quadrilateral linkage due to the reaction of the gauge blade against the ground so as to tilt the triangular frame in the same direction as the tractor.*

*3. A land leveling implement for attachment to a tractor and the like having front and rear wheels and vertically spaced rearwardly projecting arms pivotally secured to the tractor for movement in a vertical plane, said implement including a scraper blade having a rigid, upwardly projecting first member fixed thereto, means for pivotally securing the rearwardly projecting arms to said scraper blade and first member at vertically spaced points for freely floating movement*

*in a generally vertical plane, a gauge member, a rigid, generally horizontal elongated tongue connecting the gauge member and the scraper blade, and a rigid, forwardly and upwardly extending second member connecting the gauge member and said first member.*

*4. The combination with a tractor having spaced front and rear wheels and vertically spaced rearwardly extending rigid arms pivotally secured to the tractor for movement in a vertical plane, of a land leveler comprising a scraper unit including a transverse scraper blade and a rigid, upwardly extending first member fixed to the blade, means for pivotally attaching the trailing ends of the rigid arms at vertically spaced points on the scraper unit, thereby defining a freely floating quadrangular linkage between the land leveler and the tractor freely movable in a generally vertical plane, a gauge member, a rigid elongated tongue on the gauge member, a rigid second member fixed to the gauge member and projecting forwardly and upwardly therefrom, means for pivotally attaching the tongue and second member at vertically spaced points to the scraper unit for movement about a vertical axis only.*

*5. A land leveler for use with a prime mover having a frame comprising a triangular leveler frame rigid in a vertical plane and including an upright leg, a generally horizontal leg extending rearwardly from said upright leg, and a hypotenuse member, a transverse scraper blade on the frame near the leading or forward corner thereof, a gauge on the triangular frame near the trailing or rearward corner thereof, and means forming a quadrangular linkage for floatingly connecting the triangular frame and the prime mover, said means including a plurality of vertically spaced rigid arms each pivotally secured at their trailing ends to the upright leg at vertically spaced points for movement in generally vertical planes, and secured at their opposite ends at vertically spaced points fixed with respect to the prime mover frame whereby tilting movement of the prime mover frame in a generally vertical plane is transmitted through the quadrangular linkage to the triangular frame and tilts the triangular frame in the same direction as the prime mover frame.*

*6. The structure defined in claim 4, which includes means for increasing and decreasing the length of the hypotenuse.*

*7. The structure defined in claim 4, which includes means for pivotally connecting the hypotenuse member and the horizontal leg of the triangular frame to the upright leg for pivotal movement about a substantially vertical axis.*

FRED T. SMITH.

REFERENCES CITED

The following references are of record in the file of this patent, or the original patent:

UNITED STATES PATENTS

| Number | Name | Date |
|---|---|---|
| 1,857,479 | Royer | May 10, 1932 |
| 1,968,412 | Lull | July 31, 1934 |
| 2,192,254 | Beadle | Mar. 5, 1940 |
| 2,277,889 | Shumaker | Mar. 31, 1942 |
| 2,359,121 | Kinnan | Sept. 26, 1944 |
| 2,433,019 | Arps | Dec. 23, 1947 |

FOREIGN PATENTS

| Number | Country | Date |
|---|---|---|
| 559,336 | Great Britain | Feb. 15, 1944 |